US008251792B2

(12) United States Patent
Durham et al.

(10) Patent No.: US 8,251,792 B2
(45) Date of Patent: Aug. 28, 2012

(54) PERIPHERAL DEVICE CONTROL SYSTEM FOR WAGERING GAME SYSTEMS

(75) Inventors: Timothy J. Durham, Oak Park, IL (US); Charles R. Bleich, Cary, IL (US); Stephen A. Canterbury, Antioch, IL (US)

(73) Assignee: WMS Gaming Inc., Waukegan, IL (US)

(*) Notice: Subject to any disclaimer, the term of this patent is extended or adjusted under 35 U.S.C. 154(b) by 465 days.

(21) Appl. No.: 12/375,826

(22) PCT Filed: Aug. 9, 2007

(86) PCT No.: PCT/US2007/017711
§ 371 (c)(1),
(2), (4) Date: Jan. 30, 2009

(87) PCT Pub. No.: WO2008/021181
PCT Pub. Date: Feb. 21, 2008

(65) Prior Publication Data

US 2009/0291749 A1 Nov. 26, 2009

Related U.S. Application Data

(60) Provisional application No. 60/821,894, filed on Aug. 9, 2006.

(51) Int. Cl.
*A63F 9/24* (2006.01)
*A63F 13/00* (2006.01)
*G06F 17/00* (2006.01)
*G06F 19/00* (2006.01)

(52) U.S. Cl. ................ 463/16; 463/20; 463/25; 463/40; 463/42

(58) Field of Classification Search .................... 463/16, 463/20, 25, 40, 42
See application file for complete search history.

(56) References Cited

U.S. PATENT DOCUMENTS

| | | | | |
|---|---|---|---|---|
| 6,102,394 | A | 8/2000 | Wurz et al. | |
| 6,117,010 | A | 9/2000 | Canterbury et al. | |
| 6,251,014 | B1 | 6/2001 | Stockdale et al. | |
| 6,443,839 | B2 | 9/2002 | Stockdale et al. | |
| 6,503,147 | B1 | 1/2003 | Stockdale et al. | |
| 6,556,450 | B1 * | 4/2003 | Rasmussen et al. | 361/754 |
| 6,979,266 | B2 * | 12/2005 | Lemay et al. | 463/40 |
| 2003/0142683 | A1 * | 7/2003 | Lam et al. | 370/401 |
| 2005/0085293 | A1 * | 4/2005 | Lindo | 463/25 |
| 2005/0172101 | A1 * | 8/2005 | Mach | 712/2 |
| 2006/0068920 | A1 | 3/2006 | Lemay et al. | |
| 2006/0287098 | A1 * | 12/2006 | Morrow et al. | 463/42 |

OTHER PUBLICATIONS

"International Application Serial No. PCT/US07/17711, International Search Report and Written opinion mailed Aug. 27, 2008", 9 pgs.

* cited by examiner

*Primary Examiner* — David L Lewis
*Assistant Examiner* — Adetokunbo Torimiro
(74) *Attorney, Agent, or Firm* — Schwegman, Lundberg & Woessner, P.A.

(57) ABSTRACT

Methods and systems for assigning addresses to peripheral devices in wagering game machines are described herein. In one embodiment, a method includes transmitting a first request in a wagering game machine, wherein the first request is addressed to a configuration address, and wherein the wagering game machine is configured to present wagering games upon which monetary value can be wagered. The method can also include detecting a first response to the first request, the first response originating from a first of a plurality of peripheral devices of the wagering game machine. The method can also include assigning a first address to the first of the plurality of peripheral devices and notifying the first of the peripheral devices about the first address.

24 Claims, 12 Drawing Sheets

PERIPHERAL DEVICE CONTROL SYSTEM FOR WAGERING GAME SYSTEMS

RELATED APPLICATION

This patent application is a U.S. National Stage Filing under 35 U.S.C. 371 from International Patent Application Serial No. PCT/US2007/017711 filed Aug. 9, 2007, and published on Feb. 21, 2008, as WO 2008/021181 A2 and republished as WO 2008/021181 A3, which claims the priority benefit of U.S. Provisional Patent Application Ser. No. 60/821,894 filed Aug. 9, 2006 and entitled "PERIPHERAL DEVICE CONTROL SYSTEM FOR WAGERING GAME SYSTEMS", which applications are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments relate generally to wagering game systems, and more particularly, to techniques for configuring peripheral devices in wagering game systems.

BACKGROUND

Wagering game machines, such as slot machines, video poker machines and the like, have been a cornerstone of the gaming industry for several years. These wagering game machines can include peripheral devices for performing numerous wagering-game-related functions, such as receiving player input, displaying wagering game results, printing vouchers, etc. Some peripheral devices require configuration of their communication addresses before they can respond to certain types of communications. In some cases, the peripheral devices can be configured by setting DIP switches or jumpers inside the peripheral devices, where the DIP switches or jumpers are used for specifying communication addresses at which the peripheral devices can receive communications. After the DIP switches or jumpers are set and other configuration tasks are performed, the peripheral devices can respond to communications associated with their addresses. For example, after a voucher printer's DIP switches are configured and other configuration operations performed, the voucher printer can print ticket vouchers in response to print requests sent to the printer's communication address.

BRIEF DESCRIPTION OF THE FIGURES

Embodiments of the present invention are illustrated in the Figures of the accompanying drawings in which.

DESCRIPTION OF THE EMBODIMENTS

This description is divided into five sections. The first section includes an introduction to embodiments of the invention, whereas the second section describes example architectures. The third section presents example operations and the fourth section describes example wagering game machines. The fifth section provides some general comments.

Introduction

Some embodiments of the invention enable wagering game systems to automatically and dynamically assign communication addresses to peripheral devices. For example, instead of relying on manual configuration (e.g., setting DIP switches or jumpers), embodiments can determine what peripheral devices are available and assign each peripheral device a communication address. The discussion of FIG. 1 describes this in greater detail.

Figure 1:
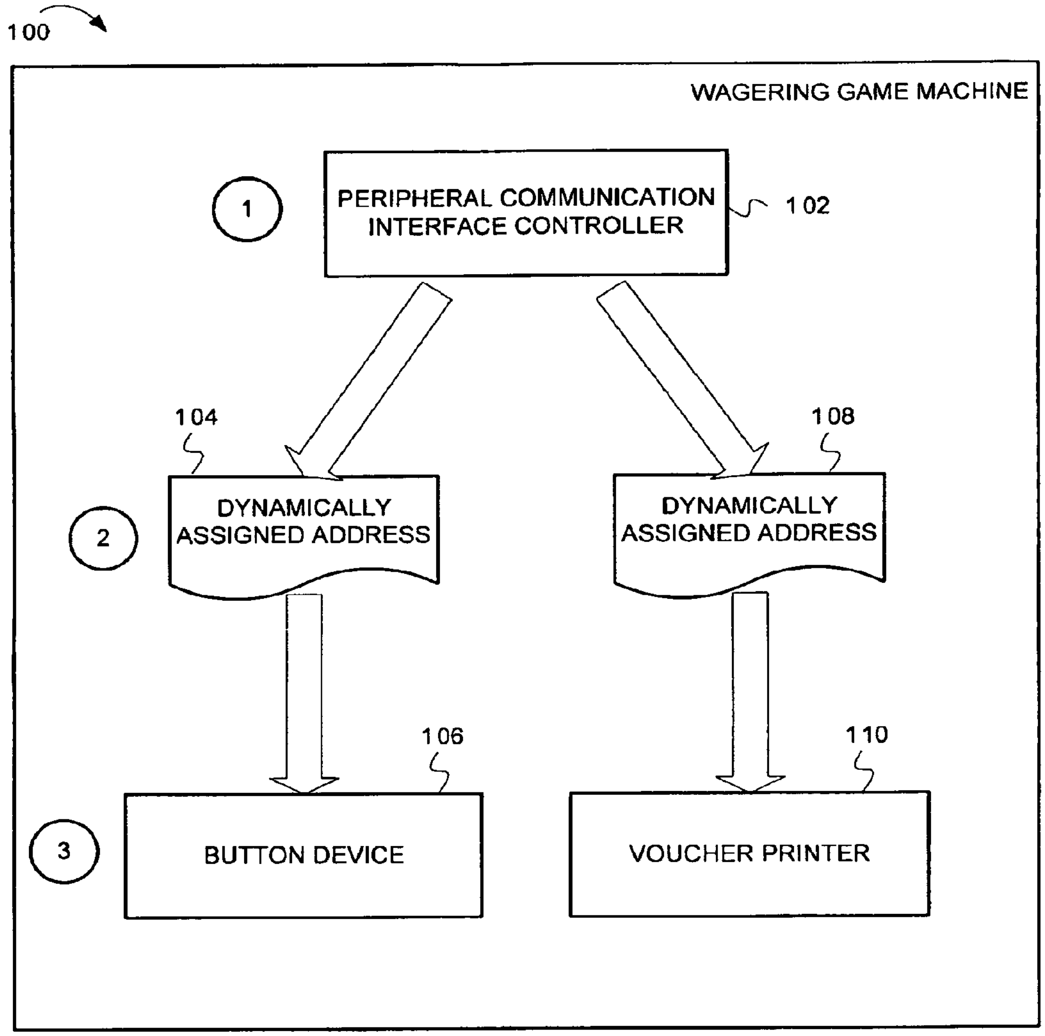
FIG. 1 is a dataflow diagram illustrating dataflow and operations for dynamically configuring peripheral device communication addresses in a wagering game system, according to example embodiments of the invention.

FIG. 1 is a dataflow diagram illustrating dataflow and operations for dynamically configuring peripheral device communication addresses in a wagering game system, according to example embodiments of the invention. In FIG. 1, a wagering game machine 100 includes a peripheral device communication controller 102, button device 106, and voucher printer 110. The button devices 106 and voucher printer 110 are peripheral devices.

In FIG. 1, the dataflow and operations occur in three stages. At stage one, the peripheral device communication controller 102 receives an indication that it should dynamically assign addresses to the wagering game machine's peripheral devices. The indication can originate from a general purpose microprocessor (not shown) in the wagering game machine 100. The peripheral device communication controller 102 can dynamically assign peripheral device addresses during a system initialization process, such as basic input output system (BIOS) initialization or operating system initialization. Alternatively, the peripheral device communication controller 102 can assign peripheral device addresses as part of a post-initialization reconfiguration.

At stage two, the peripheral device communication controller 102 discovers the peripheral devices 106 and 110 and assigns them unique communication addresses. For example, the peripheral device communication controller 102 may assign communication address 1000 to the button device 106, while assigning communication address 1002 to the button device 110. In FIG. 1, the peripheral device communication controller 102 notifies the peripheral devices of their dynamically assigned addresses by sending communication messages 104 and 108.

At stage three, the button devices 106 and voucher printer 110 each configure themselves to respond to communications addressed to their respective new addresses. After the address configuration, the button device 106 can respond to communications addressed to 1000, while the voucher printer 110 can respond to communications addressed to 1002. As a result, the wagering game machine 100 can dynamically assign communication addresses without manually setting of jumpers, DIP switches, or other peripheral device components.

While this section introduces some embodiment of the invention, the following sections will describe other embodiments that include different features.

Example Architecture

This section describes example architectures according to embodiments of the invention.

Figure 2:
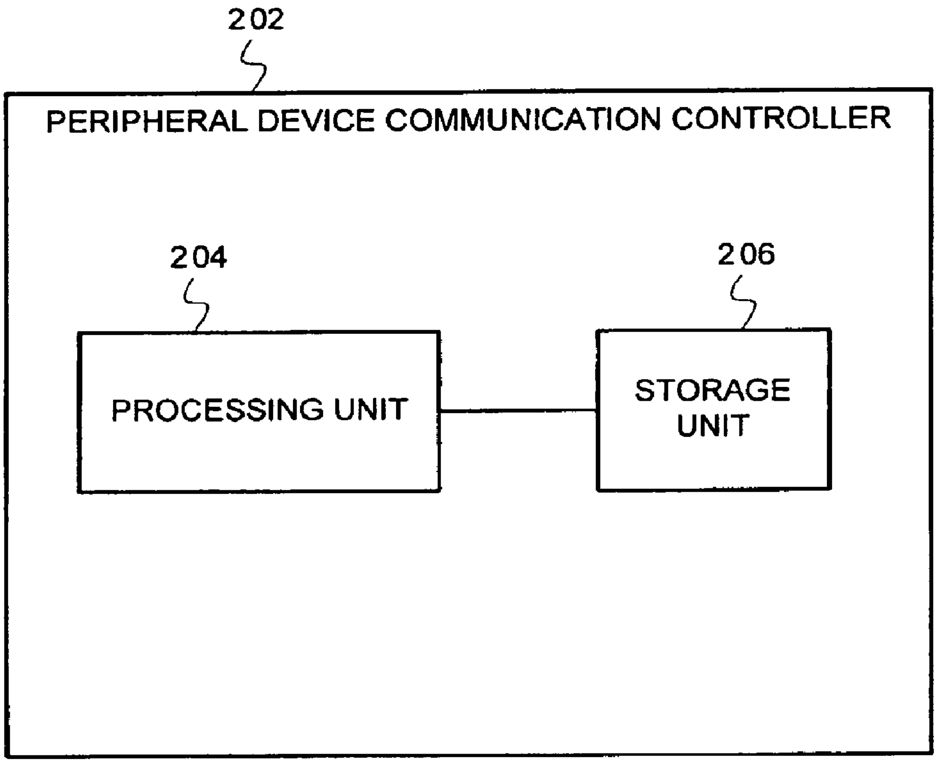
FIG. 2 is a block diagram illustrating a peripheral device communication controller, according to example embodiments of the invention.

FIG. 2 is a block diagram illustrating a peripheral device communication controller, according to example embodiments of the invention. In FIG. 2, the peripheral device communication controller includes a processing unit 204 and a storage unit 206. The processing unit 204 can include any logic suitable for assigning peripheral device addresses, distributing peripheral device content, and performing other operations described herein. The storage unit 206 can be any storage media suitable for storing peripheral device content, such as configuration information, program code, image data, audio data, etc.

Figure 3:
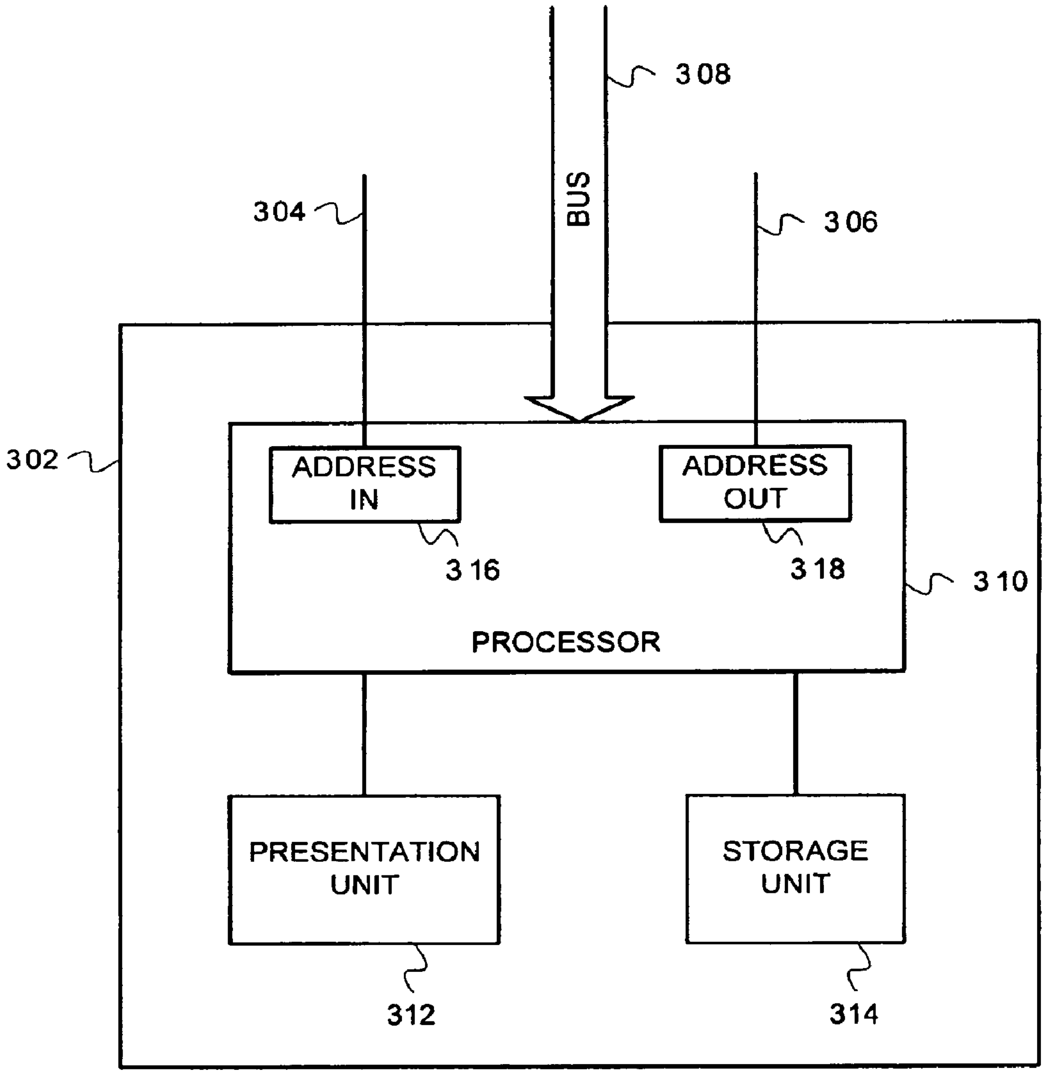
FIG. 3 is a block diagram illustrating a peripheral device architecture, according to example embodiments of the invention.

This section continues with a discussion of FIG. 3, which describes an architecture for a peripheral device.

FIG. 3 is a block diagram illustrating a peripheral device architecture, according to example embodiments of the invention. According to embodiments, the peripheral device 302 can be a button device, voucher printer, card reader, scanner, or other peripheral device suitable for use in wagering game machines.

In FIG. 3, the peripheral device 302 includes a processor 310, which includes an address-in register 316 and an address-out register 318. The address-in register 316 can receive data over an address-in line 304, while the address-out register 318 can send data over an address-out line 306. The peripheral device 302 can use the address-in and address-out registers for dynamically acquiring communications addresses from a peripheral device communication controller (not shown in FIG. 3). Operations for configuring peripheral device addresses are described below, in the next section.

In FIG. 3, the processor 310 is connected to a storage unit 314 and presentation unit 312. The storage unit 314 can include any storage media suitable for storing information useful in configuring peripheral devices in a wagering game machine. The input/output unit 312 can include any mechanism suitable for presenting information. In one embodiment, the input/output unit 312 can include a printer, liquid crystal display, light emitting diode display, speaker, etc. Additionally, the input/output unit 312 can include pressure sensors, light sensors, sound sensors, or other suitable input devices.

This section continues with additional details about how peripheral device communication controllers and peripheral devices can work together in wager gaming machines.

Figure 4:
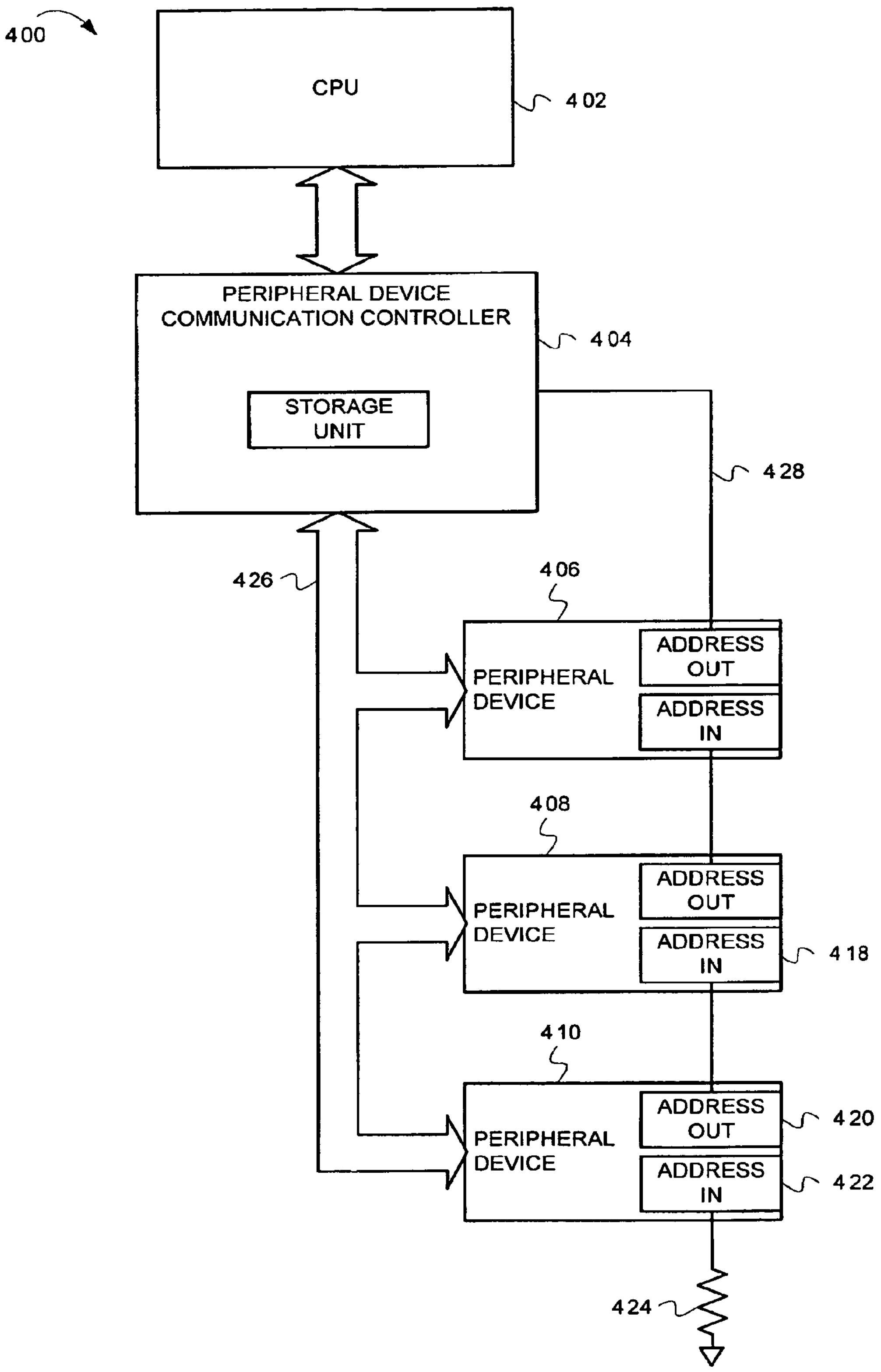
FIG. 4 is a block diagram illustrating a wager gaming machine including a peripheral device communication controller and peripheral devices, according to example embodiments of the invention.

FIG. 4 is a block diagram illustrating a wager gaming machine including a peripheral device communication controller and peripheral devices, according to example embodiments of the invention. In FIG. 4, the wager gaming machine 400 includes a CPU 402, which represents any hardware and software for conducting wagering games and configuring and using peripheral devices. The CPU 402 is connected to a peripheral device communication controller 404, which is connected to peripheral devices 406, 408, and 410 via a bus 426. Each peripheral device includes address-out and address-in registers for use when configuring communication addresses.

In FIG. 4, an address signal line 428 daisy chains the peripheral devices 406, 408, and 410 to the peripheral communication controller 404. The address signal line 428 connects the last peripheral device of the daisy chain (i.e. peripheral device 410) to a resistor 424, which is connected to an electrical ground.

In one embodiment, before the controller 404 assigns peripheral device addresses, each peripheral device transmits a "do not to respond" indicator to the address-in register of the device to which it is connected. The "do not respond" indicators (e.g., a data value, high signal, or other suitable signal) tell the peripheral devices not to respond to communications on the bus 426. In one embodiment, a peripheral device whose address-in register does not include a "do not respond" indicator can respond to communications on the bus 426 that are addressed to a "configuration address."

Consider the following example. Device 410 transmits a "do not respond" indicator to device 408, which transmits a "do not respond" indicator to device 406, which transmits the same to the controller 404. Because device 410 is connected to the electrical ground, it is the only device that does not receive a "do not respond" indicator. Instead, it receives a "respond to configuration address" indicator (e.g., data value, a low signal, etc.). Thus, the device 410 can respond to communications addressed to a configuration address. The controller 404 then sends a new address in a communication addressed to the configuration address. In one embodiment, after the device 410 receives a new address, it responds to the new address and does not respond to the configuration address. Also, after receiving a new address, the device 410 can send a "respond to configuration address" indicator to device 408, telling device 408 to respond to the configuration address. The process can be repeated until the controller 404 assigns all the peripheral devices 406, 408, and 410 a new addresses. At which point signal line 428 will be carry a "respond to configuration address" indicator indicating to controller 404 that all devices have been discovered.

After the controller 404 assigns new addresses to the peripheral devices 406, 408, and 410, it can distribute peripheral device content to those devices. In some embodiments, the controller 404 can multicast and/or broadcast communications over the bus 426. In one embodiment, the controller 404 sends broadcast communications to a broadcast address. For multicast communications, the controller 404 can address the communications to multiple addresses. The next section describes operations performed by these and other embodiments of the invention.

Figure 5:
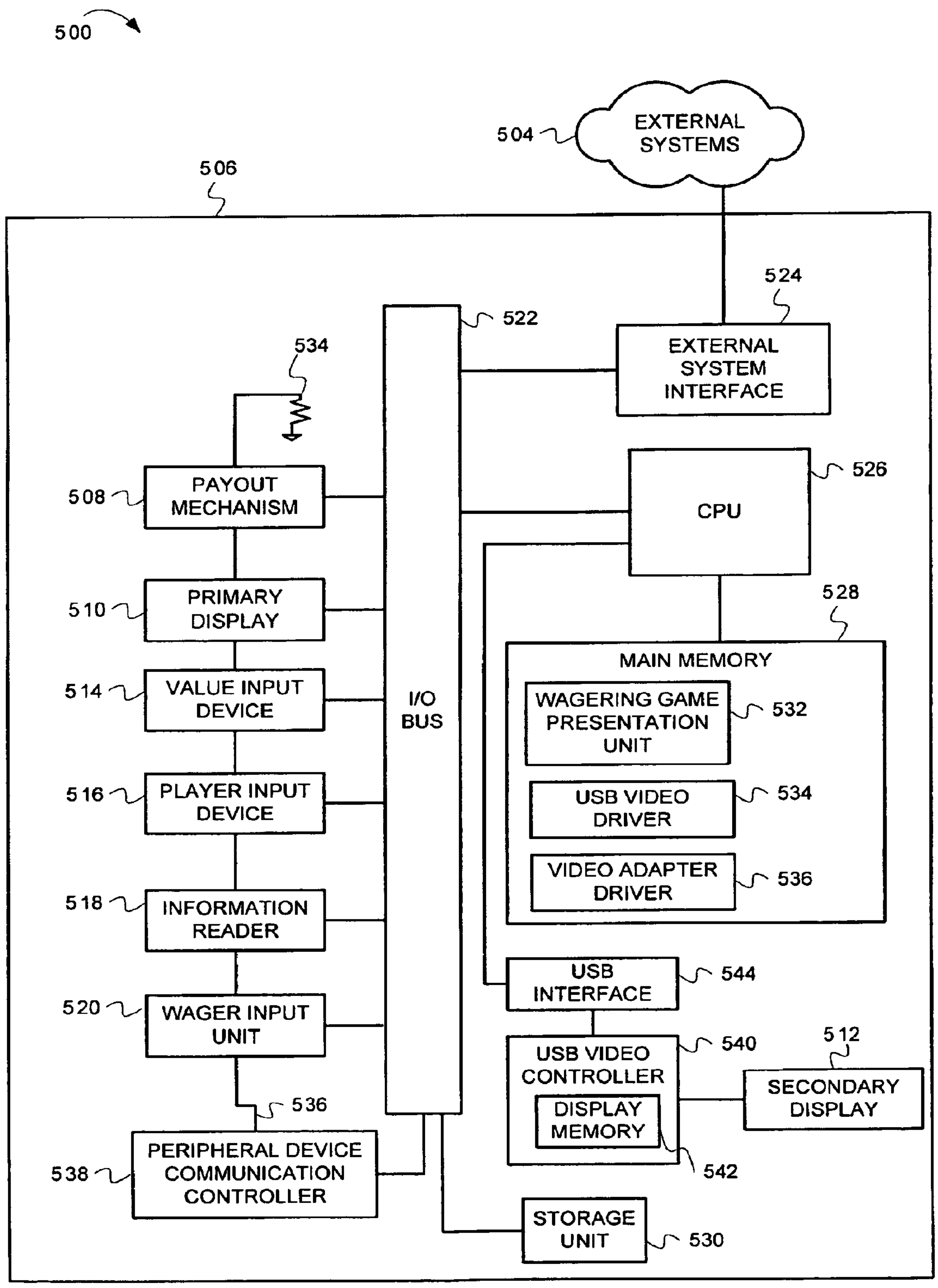
FIG. 5 is a block diagram illustrating a wagering game machine architecture, according to example embodiments of the invention.

While FIGS. 2-4 show embodiments of a peripheral device communication controller and peripheral devices, FIG. 5 shows an example wagering game machine architecture.

FIG. 5 is a block diagram illustrating a wagering game machine architecture, according to example embodiments of the invention. In FIG. 5, the wagering game machine architecture 500 includes a wagering game machine 506. The wagering game machine 506 includes a central processing unit (CPU) 526 connected to main memory 528. The main memory 528 includes a wagering game presentation unit 532, USB video driver 534, and video adapter driver 536. In one embodiment, the wagering game presentation unit 532 can present wagering games, such as video poker, video black jack, video slots, video lottery, etc., in whole or part.

The CPU 526 is also connected to an input/output (I/O) bus 522, which facilitates communication between the wagering game machine's components. The I/O bus 522 is connected to several wager gaming peripheral devices and a peripheral device communication controller 538. The peripheral devices include a payout mechanism 508, primary display 510 and any suitable video adapter (not shown), value input device 514, player input device 516, information reader 518, and storage unit 530. The player input device 516 can include the value input device 514 in that the player input device 516 can be used to place wagers. In FIG. 5, a peripheral device configuration bus 536 daisy chains the peripheral devices to the peripheral device communication controller 538 (hereinafter "controller 538"). The peripheral device configuration bus 536 also connects one of the peripheral devices (i.e., the payout mechanism 508) to an electrical ground through a resistor 534.

In one embodiment, the controller 538 can dynamically discover what peripheral devices are available in the wagering game machine 506 and assign unique communication addresses to each peripheral device. In another embodiment, the controller 538 can cache peripheral device content for later distribution to one or more of the peripheral devices. Because the peripheral device communication controller 538 can configure peripheral device addresses and download peripheral device content, embodiments enable the wagering game machine 506 to complete its initialization processes (e.g., verification and boot-up) faster than if the CPU 526 were working alone. In cases where peripheral device addresses are reconfigured after the initialization process, the controller's cache of peripheral device content can reduce time and resources needed for loading new content to the peripheral devices.

The CPU 528 is also connected to a USB interface 544, which is connected to a USB video controller 540. The USB video controller 540 includes display memory 542 and is connected to a secondary display 512. The USB video controller 540 can work with the USB video driver 534 to present video content on the secondary display 512. In one embodiment, the USB video driver 534 can compress video content changes made by the video adapter driver 536 and pass those changes on to the USB video controller 540. In turn, the USB video controller 540 can modify its internal display memory 542 based on the changes, so the secondary display 512 can present the resulting video content. Compressing the video content can reduce the bandwidth needed for presenting the video content on the secondary display 512. In one embodiment, the USB video controller 540 can pass video to a plurality of video devices. The USB video controller 540 can include a USB-NIVO video controller, available from Newnham Research of Palo Alto, Calif., or any other suitable hardware and/or software for presenting video content over USB connections.

The I/O bus 522 is also connected to an external system interface 224, which is connected to external systems 504 (e.g., wagering game networks).

In one embodiment, the wagering game machine 506 can include additional peripheral devices and/or more than one of each component shown in FIG. 5. For example, in one embodiment, the wagering game machine 206 can include multiple external system interfaces 524 and multiple CPUs 526. In one embodiment, any of the components can be integrated or subdivided. Additionally, in one embodiment, the components of the wagering game machine 506 can be interconnected according to any suitable interconnection architecture (e.g., directly connected, hypercube, etc.).

In one embodiment, any of the components of the wagering game machine 206 (e.g., the wagering game presentation unit 532) can include hardware, firmware, and/or software for performing the operations described herein. Any of the wagering game machine's components can include machine-readable media including instructions for performing any of the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory devices or media, etc. Machine-readable media also includes any media suitable for transmitting software over a network.

This section continues with yet another wagering game machine architecture.

Figure 6:
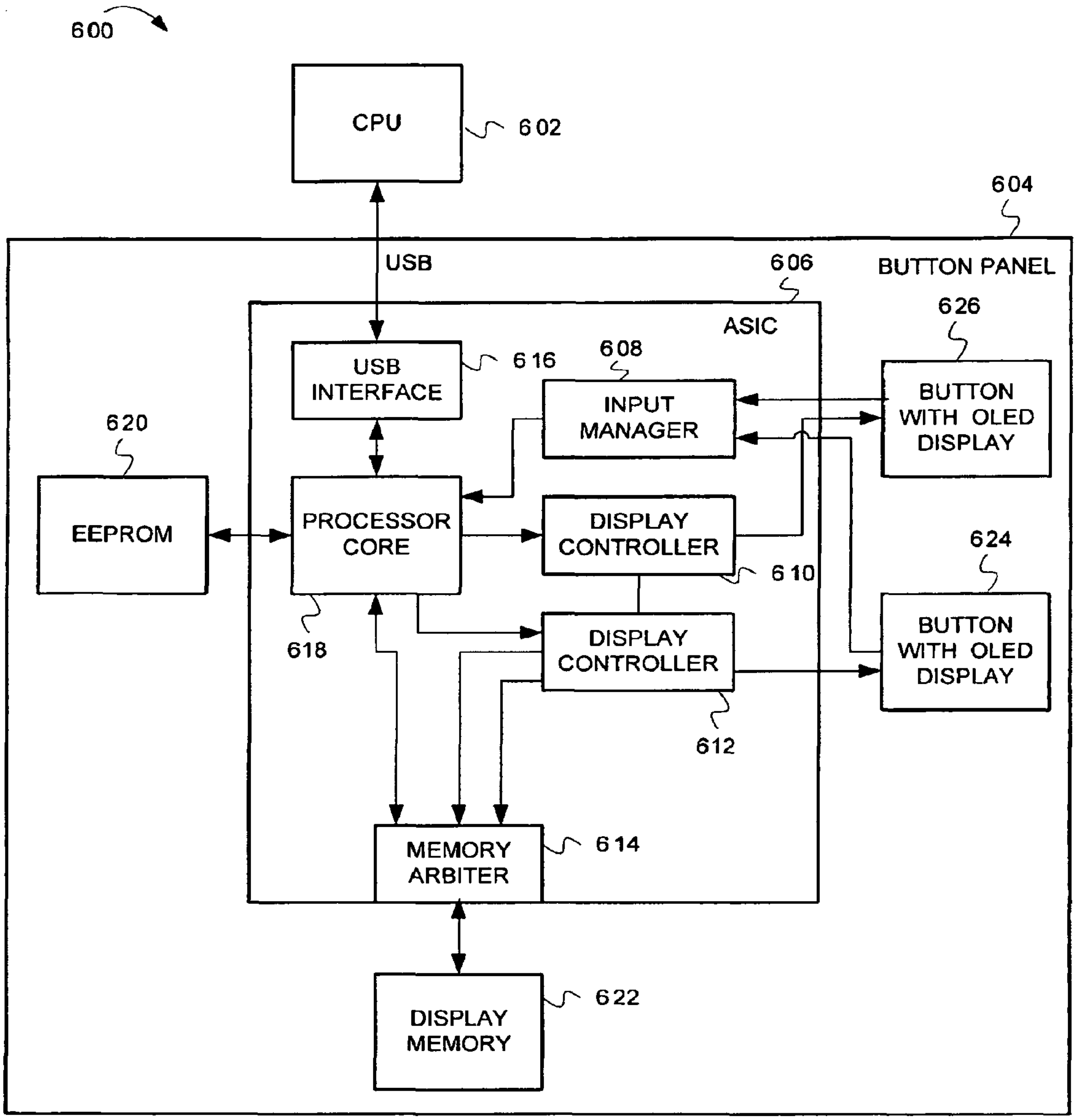
FIG. 6 is a block diagram illustrating an architecture for configuring a button panel in a wagering game machine, according to example embodiments of the invention.

FIG. 6 is a block diagram illustrating an architecture for configuring a button panel in a wagering game machine, according to example embodiments of the invention. In FIG. 6, a wagering game machine 600 includes a CPU 602 and button panel 604. The button panel 604 includes an application specific integrated circuit (ASIC) 606, which includes a USB interface 616 connected to the CPU 602 and a processor core 618. The processor core 618 is also connected to an EEPROM 620, display controller 612, display controller 610, input manager 608, and memory arbiter 614. The memory arbiter 614 is connected to a display memory 622.

The input manager 608 is connected to a button with organic light emitting diode (OLED) display 626 and a button with OLED display 624. The display controller 610 is connected to the button with OLED display 626, while the display controller 612 is connected to the button with OLED display 624.

The CPU 602 communicates with the ASIC 606 via a USB link and USB interface 616, where the USB interface 616 can control data transmissions across the USB link and ensure that the data meets USB standards. The ASIC's processor core 618 can control data flow to and from the CPU 602 via the USB interface 616. Upon power-up, the processor core 618 can load firmware stored in the EEPROM 620 into memory internal to the ASIC 606 (not shown). The EEPROM 620 can also store data defining the configuration of the button panel 604 (see discussion below). The CPU 602 can deliver firmware updates over the USB link.

The input manager 608 can process input/output (I/O) associated with the buttons 624 and 626. The input manager 608 can either interrupt the processor core 618 when button status changes (e.g., when a button is pressed) or it can make the button status available for polling by the processor core 618.

The buttons with OLED displays 624 and 626 can communicate with the display controllers 610 and 612 via a serial SPI protocol or any other suitable protocol. The display controllers 610 and 612 can facilitate data transmissions between the processor core 168 and the buttons 624 and 626 for tasks such as setting OLED refresh rates, etc. The display controllers 610 and 612 can include registers accessible by the processor core 618, where the registers enable the display controllers 610 and 612 to transfer data from the display memory 622 to the OLED displays.

The memory arbiter 614 can arbitrate access to the display memory 622. For example, the memory arbiter 614 can arbitrate display memory accesses made by the processor core 618 and the display controllers 610 and 612. The display memory can store information to be displayed on the buttons' OLED displays. The processor core 618 can place the information in the display memory 622. The display memory 622 and/or ASIC's memory (not shown) can be any suitable size. For example, they can be large enough for the processor core 618 to facilitate scrolling images across one or more OLED displays, inverting images, etc. The display memory 622 can include dynamic RAM (DRAM), static RAM (SRAM), and/or multi-port memory.

The button panel 604 can include buttons that do not include OLEDs. In such embodiments, the ASIC 606 can include a lighting controller (not shown) to control backlighting for the buttons that do not include OLED displays or it can provide extra lighting for buttons that use OLED displays.

The architecture shown in FIG. 6 can be modified in numerous ways. For example, the display memory 622 can be part of the ASIC 606. Also, the USB interface 616 and processor core 618 can be moved outside the ASIC 606.

In one embodiment, the EEPROM 620 stores information about how the button panel 604 is configured. The configuration information can include information identifying the types of devices located on the button panel 604. The item types can include switch type, OLED display type, backlighting device type, etc. The configuration information can also include coordinates of where the items are located. The processor core 618 can provide the configuration information to the CPU 602.

The following example button panel configuration includes three items, where all three items have the same Y coordinate, so they are aligned in a row across the button panel.

Example Button Panel Configuration

| | | |
|---|---|---|
| Total Number of Items | | 03 |
| Item 1 | X coordinate | 32 |
| | Y coordinate | 25 |
| | Type | 07 (switch with backlight and OLED display) |
| | Switch Number | 01 (switch input is attached to position 1) |
| | Backlight Number | 01 (backlight is controlled by position 1) |
| | OLED X dimension | 96 (pixels) |
| | OLED Y dimension | 64 (pixels) |
| | OLED Z dimension | 16 (bits—64K colors) |
| Item 2 | X coordinate | 64 |
| | Y coordinate | 25 |
| | Type | 03 (switch with backlight) |
| | Switch Number | 02 (switch input is attached to position 2) |
| | Backlight Number | 02 (backlight is controlled by position 2) |
| | OLED X dimension | 00 (N/A) |
| | OLED Y dimension | 00 (N/A) |
| | OLED Z dimension | 00 (N/A) |
| Item 3 | X coordinate | 96 |
| | Y coordinate | 25 |

-continued

Example Button Panel Configuration

| | |
|---|---|
| Type | 04 (OLED display) |
| Switch Number | 00 (N/A) |
| Backlight Number | 00 (N/A) |
| OLED X dimension | 96 (pixels) |
| OLED Y dimension | 64 (pixels) |
| OLED Z dimension | 16 (bits—64K colors) |

In the example configuration information shown above, Item 1 is a game button that includes an OLED display and backlight control to light its bezel. Item 2 is a game button with backlight control (no OLED display). Item 3 is an OLED display that is mounted to the button panel for informational use (no switch is associated with the OLED display). Any of the embodiments described herein can use similar configuration information similar.

Example Operations

This section describes operations performed by embodiments of the invention. In this section, FIGS. 7 and 8 describe operations for configuring peripheral device communication addresses, while FIGS. 9 and 10 describe operations for distributing configuration content to peripheral devices in a wagering game machine.

In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., firmware). In some embodiments the operations are performed in series, while in other embodiments, the operations can be performed in parallel.

Peripheral Device Address Assignment

Figure 7:
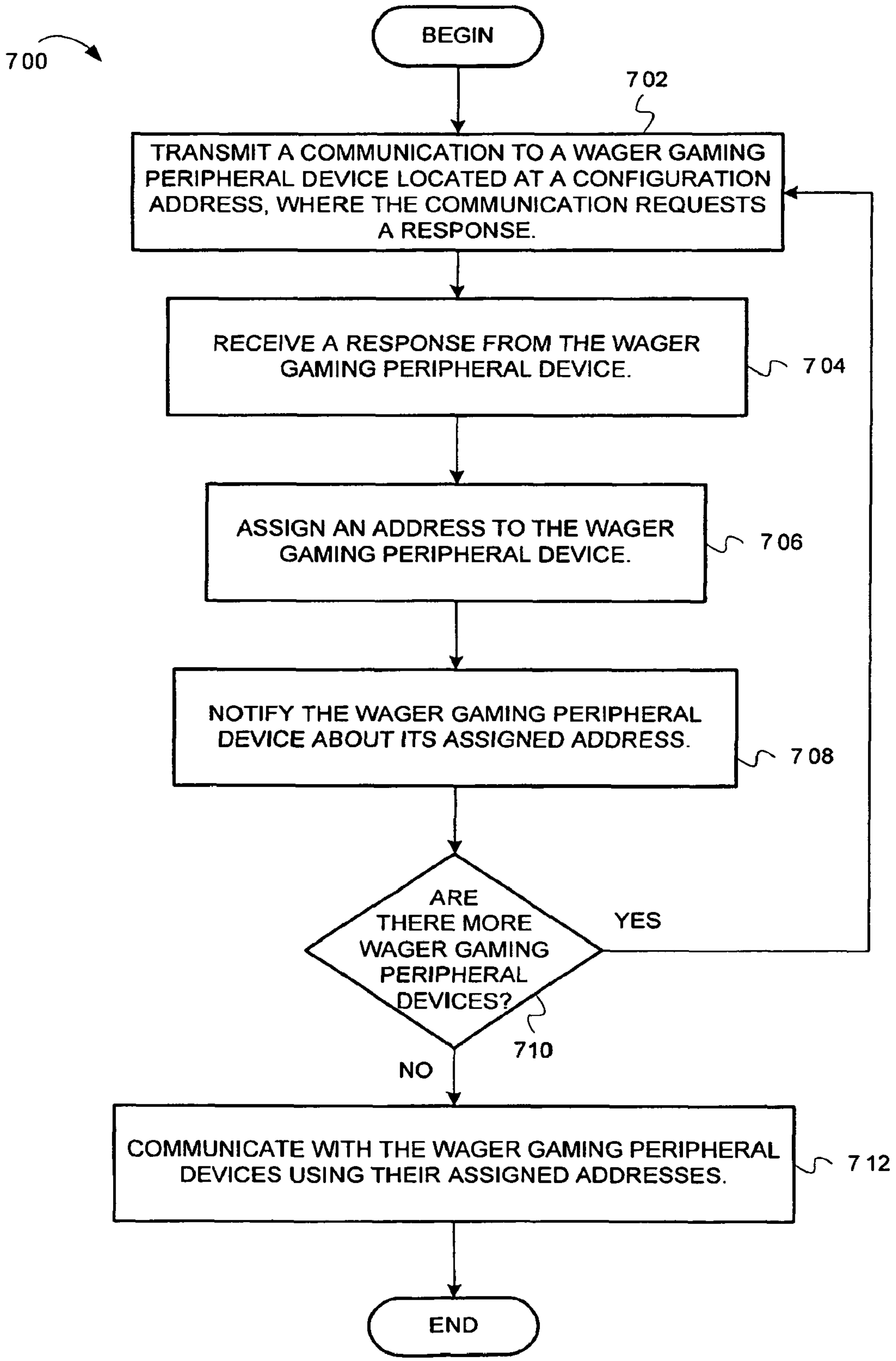
FIG. 7 is a flow diagram illustrating operations for assigning addresses to peripheral devices in a wagering game machine, according to example embodiments of the invention.

FIG. 7 is a flow diagram illustrating operations for assigning addresses to peripheral devices in a wagering game machine, according to example embodiments of the invention. The flow diagram 700 will be described with reference to some of the embodiments discussed in the preceding section. The flow 700 begins at block 702.

At block 702, a communication is transmitted to a wagering game machine peripheral device located at a configuration address, where the communication requests a response. For example, the controller 404 (see FIG. 4) transmits a communication to a configuration address (e.g., a predefined address, such as address 2000*x*) to determine whether a peripheral device is available for address configuration. In one embodiment, only one peripheral device will respond to communications addressed to the configuration address. For example, a peripheral device can respond to the configuration address if it has not been assigned another address and if it has a "respond to configuration address" indicator in its address-in register (see discussion of FIG. 4). The flow continues at block 704.

At block 704, a response is received from the peripheral device. For example, the controller 404 receives a response from the peripheral device 410 via the bus 426. In one embodiment, the response can include information about the peripheral device, such as device type, device maker, device model, etc. The flow continues at block 706.

At block 706, an address is assigned to the peripheral device. For example, the controller 404 assigns a communication address (e.g., 2010$x$) to the peripheral device 410. In one embodiment, the controller 404 maintains a table including peripheral device information (e.g., device type, model, etc.) and addresses. The flow continues at block 708.

At block 708, the peripheral device is notified about its assigned address. For example, the controller 404 transmits via the bus 426 a communication including the assigned address to the peripheral device 410. The flow continues at block 710.

At block 710, a determination is made about whether there are more peripheral devices to which addresses can be assigned. In one embodiment, when there are no more peripheral devices to configure, the controller 404 receives an indicator over the address signal line 428. For example, after the device 406 receives a new address, it sends an "address assignments complete" indicator to the controller 404 via the line 428. The flow continues at block 712.

At block 712, using the assigned addresses, communications are exchanged with the peripheral devices. For example, the controller 404 communicates with the peripheral devices 406, 408, and 410 using the assigned addresses. In one embodiment, the controller 404 can distribute peripheral device content to a particular peripheral device (e.g., a button device) by sending the content to the peripheral device's assigned address. From block 712, the flow ends.

This section continues with a discussion about how peripheral devices can participate in the address assignment process. In one embodiment, when the peripheral devices are first powered-up or commanded into their default state, they can command their address-out registers to emit "do not respond" indicators (e.g., high signals). By doing this, only the last peripheral device in the chain (e.g., peripheral device 410 in FIG. 4) will have a "respond to configuration address" value in its address-in register. The device discovery and address assignment process can continue by assigning an address to the peripheral devices that responds to the configuration address (e.g., peripheral device 410). These concepts are described below, in the discussion of FIG. 8.

Figure 8:
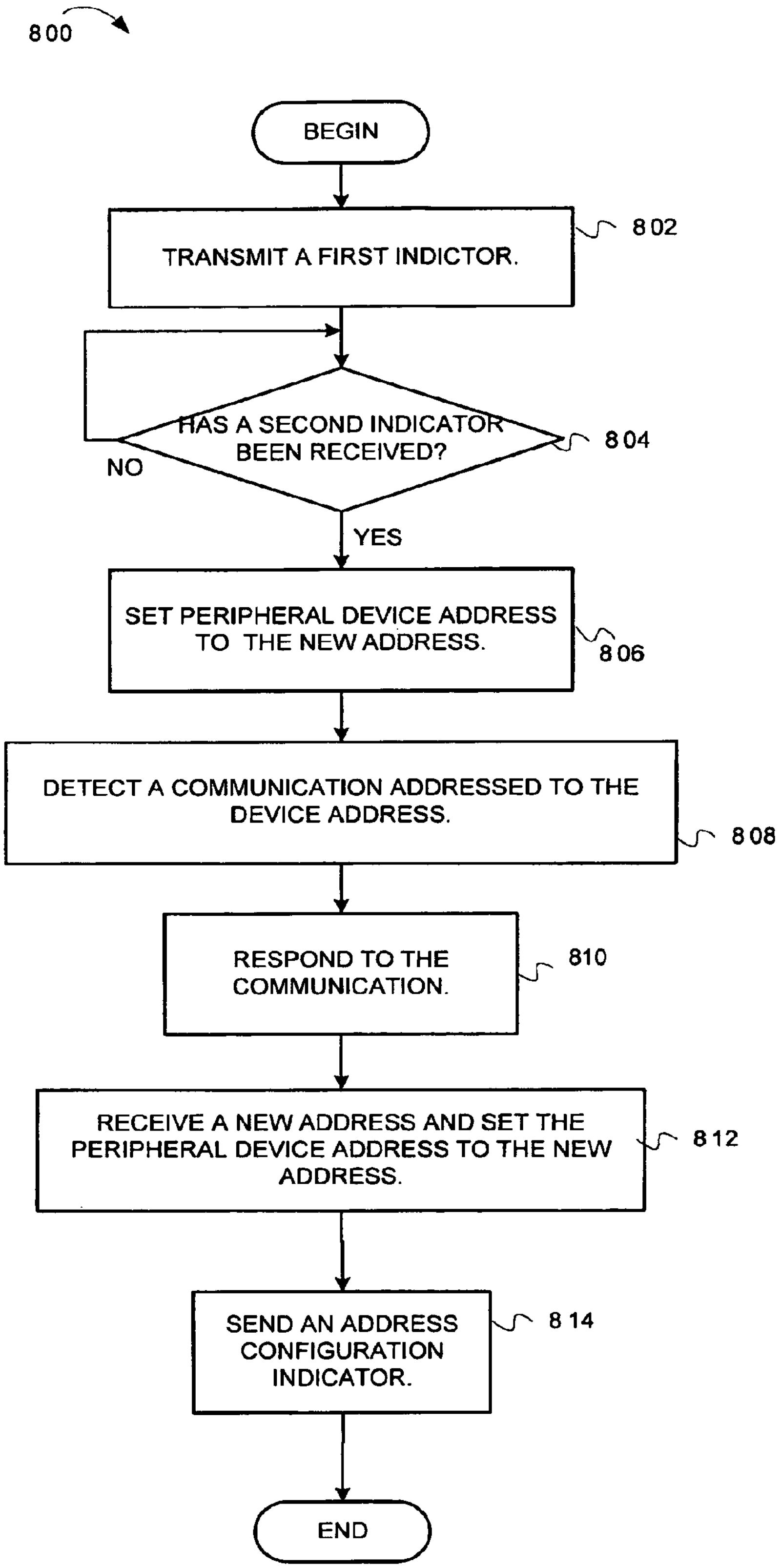
FIG. 8 is a flow diagram illustrating operations for processing an peripheral device address assignment in a wagering game machine, according to example embodiments of the invention.

FIG. 8 is a flow diagram illustrating operations for acquiring new peripheral device addresses in a wagering game machine, according to example embodiments of the invention.

At block 802, a first indicator is transmitted. For example, the peripheral device 410 transmits to the peripheral device 408 a "do not respond" indicator. In one embodiment, the peripheral device 410 transmits a data value or other suitable signal to the address-in register 418 of the peripheral device 408. The data value (i.e., the indicator) serves as an indication for the peripheral device 408 not to respond to communications addressed to a configuration address. The flow continues at block 804.

At block 804, a determination is made about whether a second indicator has been received. For example, the peripheral device 410 determines whether it has received a "respond to configuration address" indicator in its address-in register 422. In one embodiment, the device 410 is the first of the devices 406, 408, and 410 to receive the "respond to configuration address" indicator. If the second indicator (e.g., the "respond to configuration address" indicator) has not been received, the flow continues at block 804. Otherwise, the flow continues at block 806.

At block 806, the peripheral device's address is set to the configuration address. For example, the peripheral device 410 configures itself to respond to communications addressed to a configuration address. The flow continues at block 808.

At block 808, a communication addressed to the configuration address is detected. For example, the peripheral device 410 detects on the bus 426 a communication addressed to the configuration address. In one embodiment, the communication originates at the controller 404 and requests information about the peripheral device. The flow continues at block 810.

At block 810, a response to the communication is sent. For example, the peripheral device 410 responds to the controller's request for information. The flow continues at block 812.

At block 812, a new address is received and the peripheral device's address is set to the new address. For example, the peripheral device 410 receives on the bus 426 a new address from the controller 404. Additionally, the peripheral device 410 configures itself to respond to communications addressed to the new address. The flow continues at block 814.

At block 814, a second indicator is transmitted. For example, the peripheral device 410 transmits a "respond to configuration address" indicator to the address-in register 418 of the peripheral device 408. In one embodiment, sending the indicator to device 408 will cause it to listen to the configuration address and receive a new address. From block 814, the flow ends.

In one embodiment, the operations of FIGS. 7-8 can be performed during an initial configuration of a wagering game machine (e.g., boot-up) or at sometime after the initial configuration. For example, if a new peripheral device is hot plugged into the wagering game machine (i.e., added without powering-down or rebooting), the peripheral device configuration controller can assign the device a new address using the operations of FIGS. 7 and 8.

This description continues with a discussion of how embodiments can distribute and use peripheral device content.

Peripheral Device Content Distribution

Figure 9:
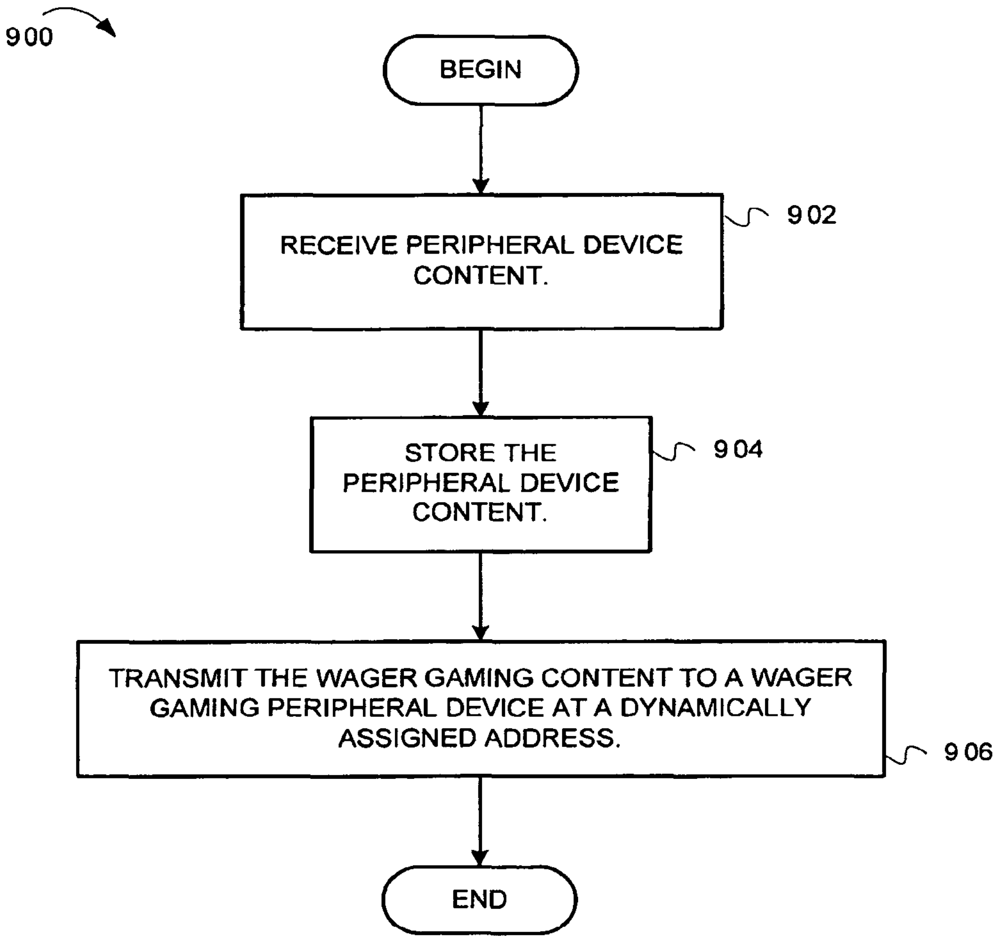
FIG. 9 is a flow diagram illustrating operations for distributing peripheral device content in a wagering game machine, according to example embodiments of the invention.

FIG. 9 is a flow diagram illustrating operations for distributing peripheral device content in a wagering game machine, according to example embodiments of the invention. The flow diagram 900 begins at block 902.

At block 902, peripheral device content is received. For example, the controller 404 (see FIG. 4) receives peripheral device content from the processor 402. The peripheral device content can include any content suitable for configuring a peripheral device for use in a wagering game machine. In one embodiment, the peripheral device content can include images, animations, audio content, sensor configuration information, and other information for configuring a button device.

In one embodiment, the controller 404 receives a peripheral device identifier with the content. The peripheral device identifier identifies the peripheral device to which the content should be delivered. For example, a configuration application program executing on the processor 402 may know that the wagering game machine includes three buttons (e.g., a bet one button, bet max button, spin button, etc.), but it does not know each button's communication address. The peripheral device identifier can indicate that the content should go to the bet max button, regardless of its address. The peripheral device identifier can work similarly with other peripheral device types. The flow continues at block 904.

At block 904, the peripheral device content is stored. For example, the controller 404 stores the peripheral device content in a storage unit (e.g., storage unit 306). The flow continues at block 906.

At block 906, using an address, the peripheral device content is transmitted to a peripheral device associated with the identifier. For example, the controller 404 transmits the content to an address of a peripheral device. In an embodiment in which a peripheral device identifier was included with the content (see discussion of block 902), the controller 404 can determine an address associated with the identifier. For example, the controller 404 can determine an address of the bet max button and transmit the content to that address. In some embodiments, the controller 404 can broadcast or multicast content to the peripheral devices 406, 408, and 410. In one embodiment, the peripheral device with the lowest address responds to a multicast/broadcast message. From block 906, the flow ends.

Figure 10:
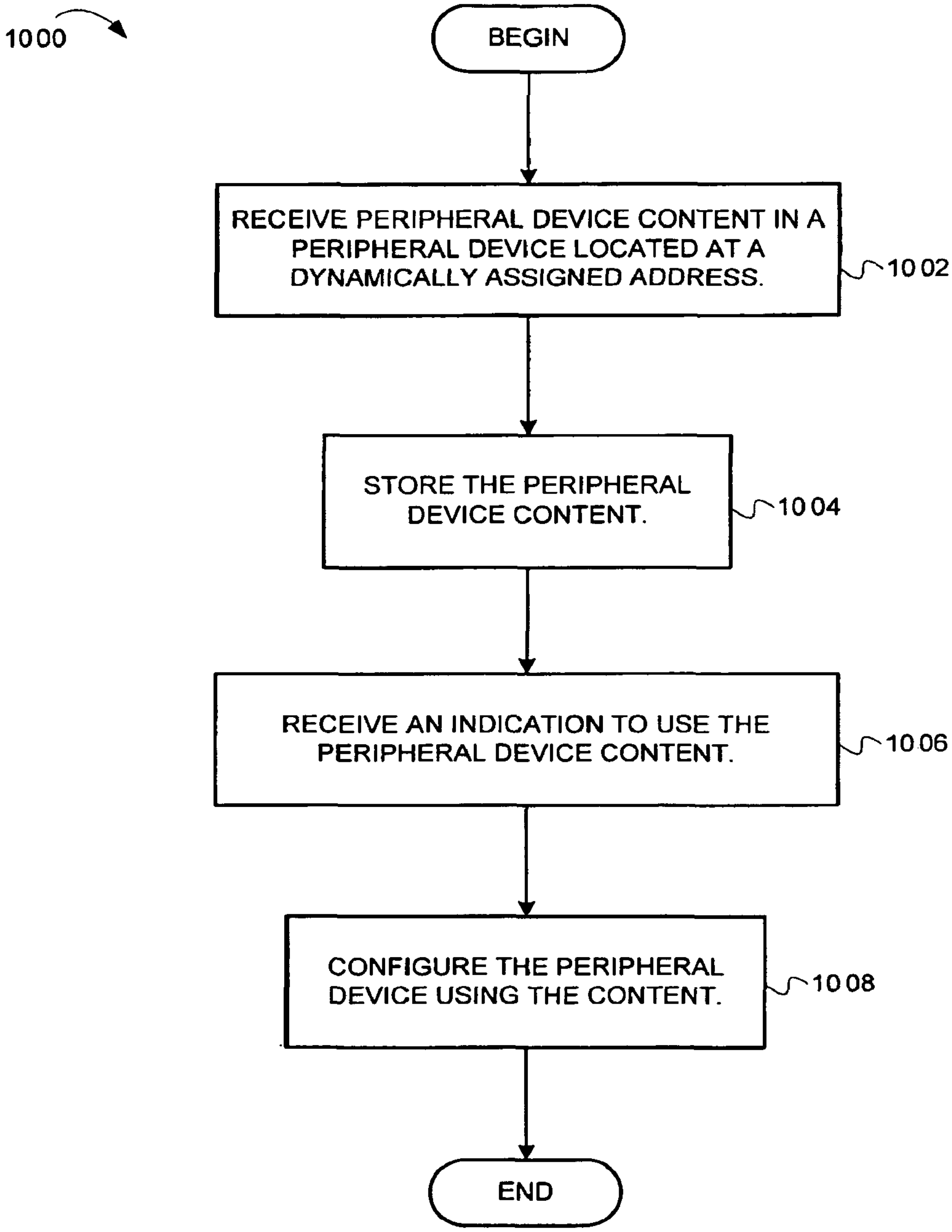
FIG. 10 is a flow diagram illustrating operations for receiving and using peripheral device content in a wagering game machine, according to example embodiments of the invention.

While the discussion of FIG. 9 describes operations for transmitting peripheral device content to peripheral devices in a wagering game machine, the discussion of FIG. 10 describes operations for receiving and using the peripheral device content. This section continues with FIG. 10.

FIG. 10 is a flow diagram illustrating operations for receiving and using peripheral device content in a wagering game machine, according to example embodiments of the invention. The flow 1000 begins at block 1002.

At block 1002, peripheral device content is received in a peripheral device. For example, the peripheral device 410 receives peripheral device content from the controller 404. In one embodiment the peripheral device content is included in communications sent to an address that was assigned to the peripheral device 410. The flow continues at block 1004.

At block 1004, the peripheral device content is stored. For example the peripheral device 410 stores the peripheral device content in a storage unit (e.g., storage unit 414). The flow continues at block 1006.

At block 1006, an indication to use the peripheral device content is received. For example, the peripheral device 410 receives an indication to use the peripheral device content to configure the peripheral device.

At block 1008, the peripheral device is configured using the peripheral device content. For example, in an embodiment where the peripheral device 410 is a button device, the peripheral device 410 uses the content to present an image on a display unit (e.g., an OLED or LCD display). From block 1008, the flow ends.

Example Wagering Game Machine and Network

Example Wagering Game Machine

Figure 11:
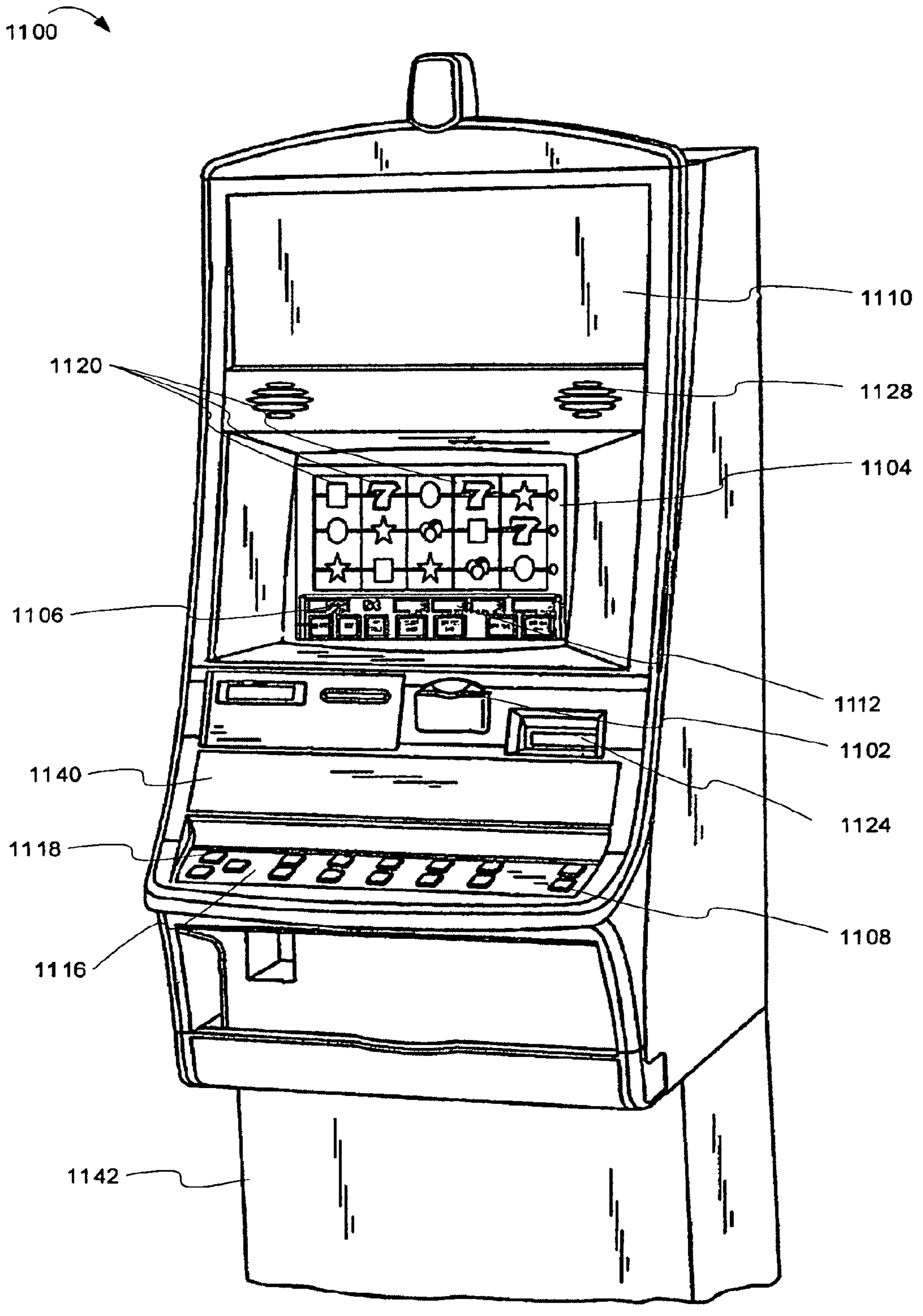
FIG. 11 is a perspective view of a wagering game machine, according to example embodiments of the invention.

FIG. 11 is a perspective view of a wagering game machine, according to example embodiments of the invention. Referring to FIG. 11, a wagering game machine 1100 is used in gaming establishments, such as casinos. According to embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bartop model, mobile handheld model, or workstation console model.

A player begins playing a basic wagering game by making a wager via the value input device 1118. The player can initiate play by using the player input device's buttons or touch screen 1128. The basic game can include arranging a plurality of symbols along a payline 1132, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface. In some embodiments, the information reader 1152 can be used to award complimentary services, restore game assets, track player habits, etc.

Example Wagering Game Network

Figure 12:
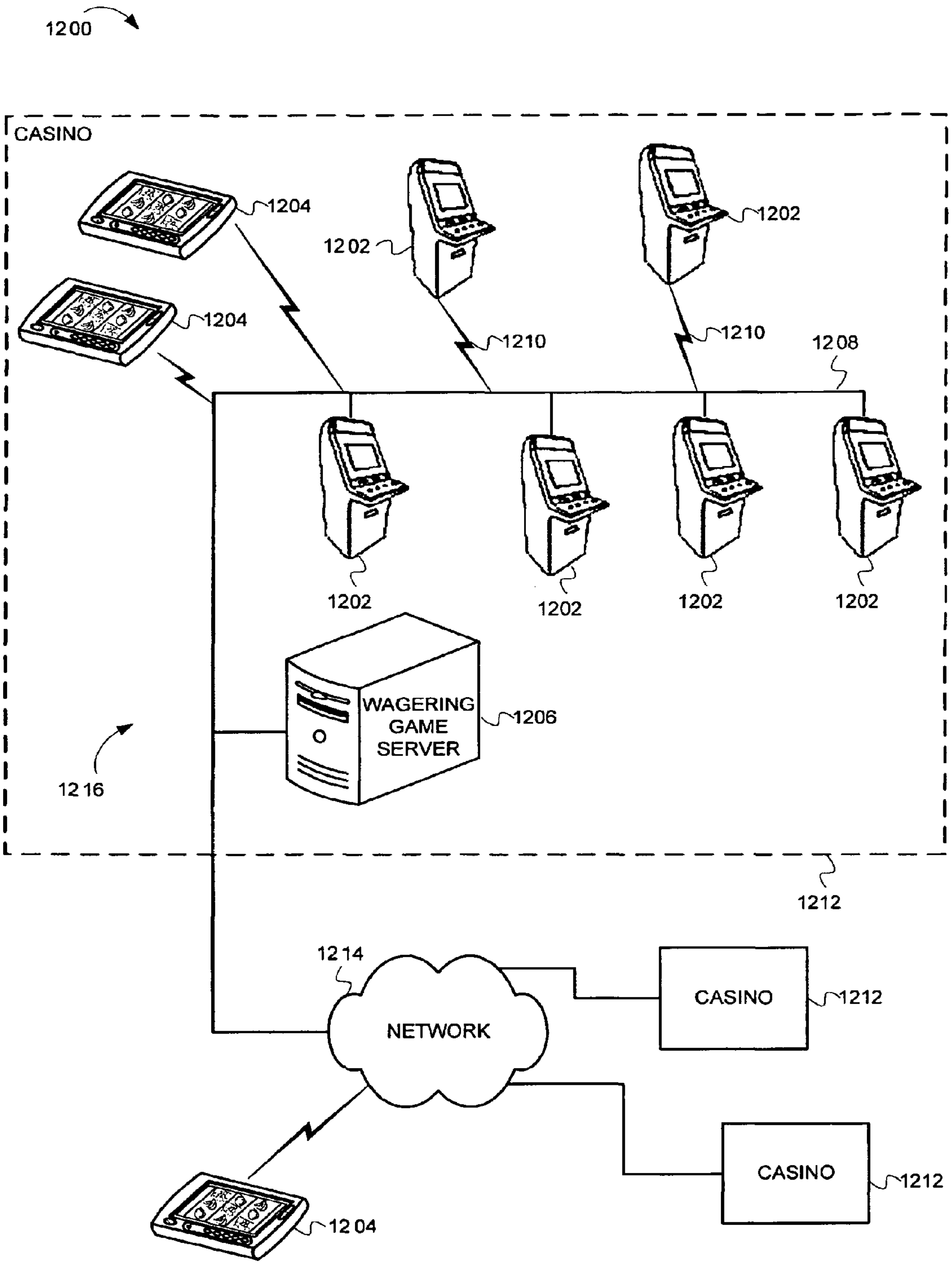
FIG. 12 is a block diagram illustrating a wagering game network, according to example embodiments of the invention.

FIG. 12 is a block diagram illustrating a wagering game network, according to example embodiments of the invention. As shown in FIG. 12, the wagering game network 1200 includes a plurality of casinos 1212 connected to a communications network 1214.

Each of the plurality of casinos 1212 includes a local area network 1216, which includes a wireless access point 1204, wagering game machines 1202, and a wagering game server 1206 that can serve wagering games over the local area network 1216. As such, the local area network 1216 includes wireless communication links 1210 and wired communication links 1208. The wired and wireless communication links can employ any suitable connection technology, such as Bluetooth, 802.11, Ethernet, public switched telephone networks, SONET, etc. In one embodiment, the wagering game server 1206 can serve wagering games and/or distribute content to devices located in other casinos 1212 or at other locations on the communications network 1214.

The wagering game machines 1202 and wagering game server 1206 can include hardware and machine-readable media including instructions for performing the operations described herein.

The wagering game machines 1202 described herein can take any suitable form, such as floor standing models, handheld mobile units, bartop models, workstation-type console models, etc. Further, the wagering game machines 1202 can be primarily dedicated for use in conducting wagering games, or can include non-dedicated devices, such as mobile phones, personal digital assistants, personal computers, etc. In one embodiment, the wagering game network 1200 can include other network devices, such as accounting servers, wide area progressive servers, player tracking servers, and/or other devices suitable for use in connection with embodiments of the invention.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

The invention claimed is:

1. A wagering game system configured to dynamically assign addresses to button devices connected via a communications bus of the game system, the game system comprising:

- a central processing unit configured to present a wagering game upon which monetary value can be wagered;
- at least a first unaddressed button device and a second unaddressed button device, each unaddressed button device connected to the communications bus, wherein an address-in register of the second button device is connected to an address-out register of the first button device via an address signal line, the first button device initially sending a do-not-respond indicator to the second button device via the address signal line; and
- a button device communication controller communicatively coupled to the central processing unit and configured to:
  - transmit data to a configuration address on the communications bus, the data causing no response from the second button device due to the do-not-respond indicator and causing the first button device to respond in the absence of the do-not-respond indicator;
  - in response to receiving a response from the first button device, assign a first communication address to the first button device, causing the first button device to terminate the do-not-respond indicator;
  - re-transmit data to the configuration address on the communications bus, the data causing no response from the newly-addressed first button device and causing the second button device to respond in the absence of the do-not-respond indicator;
  - in response to receiving a response from the second button device, assign a second communication address to the second button device; and
  - transmit wagering game-related content to at least one of the first and second button devices using the respective communication addresses and transmit game input information from the button devices to the central processing unit.

2. The wagering game system of claim 1, wherein the wagering game-related content transmitted to the at least one of the first and second button devices includes one or more images, and wherein the at least one of the first and second button devices provides a variable display used to present the one or more images.

3. The wagering game system of claim 1, wherein the address-in register of the first button devices is connected to an electrical ground via the address signal line.

4. The wagering game system of claim 1, wherein the address-out register of the second button device is connected to the button device communication controller via the address signal line, the unaddressed second button device sending a do-not-respond indicator to the button communication controller via the address signal line, and wherein assigning the second communication address to the second button device causes the second button device to terminate the do-not-respond indicator, and further causing the button device communication controller to cease re-transmitting data to the configuration address.

5. The wagering game system of claim 1, wherein the button device communication controller includes a storage unit configured to store the wagering game-related content for distribution to one or more of the button devices.

6. The wagering game system of claim 1, wherein the wagering game-related content includes a plurality of images, and wherein the first and second button devices each provide a variable display used to present the plurality of images, each variable display being selected from the group consisting of: a cathode ray tube display, a liquid crystal display, an organic liquid crystal display, a plasma display, and a light emitting diode display.

7. The wagering game system of claim 1, wherein the button device communication controller stores configuration information associated with each of the button devices, and wherein the configuration information includes physical location coordinates of each of the button devices.

8. The wagering game system of claim 1, wherein the button device communication controller is further configured to broadcast and multicast communications to at least the first and second button devices.

9. The wagering game machine of claim 1, wherein the do-not-respond indicator is an indicator selected from the group consisting of a high signal, a low signal, and a data value.

10. The wagering game system of claim 1, wherein the central processing unit is configured to transmit video content associated with the wagering game to a Universal Serial Bus (USB) video controller, and wherein the USB video controller is configured to transmit the video content over a USB link to one or more display devices.

11. A method for discovering unaddressed button devices connected to a communications bus of a wagering game system and assigning the button devices unique communication addresses, the method comprising:

transmitting a first request to a configuration address on the communications bus, the communications bus connected to least a first unaddressed button device and a second unaddressed button device, an address-out register of the first button device being connected to an address-in register of the second button device via an address signal line, the first button device sending a do-not-respond indicator to the second button device via the address signal line;

receiving the first request at the first and second button devices, the first request causing no response from the second button device due to the do-not-respond indicator and causing the first button to respond in the absence of the do-not-respond indicator;

detecting a first response to the first request, the first response originating from the first button device;

in response to detecting the first response, assigning a first communication address to the first button device, causing the first button device to terminate the do-not-respond indicator;

transmitting a second request to the configuration address;

receiving the second request at the first and second button devices, the second request causing no response from the newly addressed first button device and causing the second device to respond in the absence of the do-not-respond indicator;

detecting a second response to the second request, the second response originating from the second button device;

in response to detecting the second response, assigning a second communication address to the second button device, causing the second button device to terminate the do-not-respond indicator; and transmitting wagering game-related content to at least one of the first and second button devices at the first and second communication addresses, respectively.

12. The method of claim 11, wherein the address-out register of the second button device is connected to the button device communication controller via the address signal line, the unaddressed second button device sending a do-not-respond indicator to the button communication controller via the address signal line, wherein assigning the second communication address to the second button device causes the second button device to terminate the do-not-respond indicator, and further causing the button device communication controller to cease re-transmitting data to the configuration address.

13. The method of claim 11, wherein the do-not-respond indicator is an indicator selected from the group consisting of a high signal, a low signal, and a data value.

14. The method of claim 11, wherein the wagering game-related content includes at least one of the group consisting of audio content, video content, program code, and configuration information.

15. The method of claim 11, wherein the configuration address is a default address for the button devices.

16. A non-transitory computer-readable medium including instructions which, when executed by a gaming system configured to present a wagering game upon which monetary value can be wagered, the gaming system including unaddressed button devices connected to a communications bus, cause the gaming system to perform comprising:

present a wagering game upon which monetary value can be wagered;

transmitting a first request to a configuration address on the communications bus, the communications bus including at least a first unaddressed button device and a second unaddressed button device, an address-out register of the first button device being connected to an address-in register of the second button device via an address signal line, the first button device sending a do-not-respond indicator to the second button device via the address signal line;

receiving the first request at the first and second button devices, the first request causing no response from the second button device due to the do-not-respond indicator and causing the first button to respond in the absence of the do-not-respond indicator;

detecting a first response to the first request, the first response originating from the first button device;

in response to detecting the first response, assigning a first communication address to the first button device, causing the first button device to terminate the do-not-respond indicator;

transmitting a second request to the configuration address;

receiving the second request at the first and second button devices, the second request causing no response from the newly addressed first button device and causing the second device to respond in the absence of the do-not-respond indicator;

detecting a second response to the second request, the second response originating from the second button device;

in response to detecting the second response, assigning a second communication address to the second button device, causing the second button device to terminate the do-not-respond indicator; and transmitting wagering game-related content to at least one of the first and second button devices at the first and second communication addresses, respectively.

17. The non-transitory computer-readable medium of claim 16, wherein the address-in register of the first button devices is connected to an electrical ground via the address signal line.

18. The non-transitory computer-readable medium of claim 16, wherein the do-not-respond indicator is an indicator selected from the group consisting of a high signal, a low signal, and a data value.

19. The non-transitory computer-readable medium of claim 16, wherein the instructions further cause the gaming system to access configuration information associated with each of the button devices, wherein the configuration information includes physical location coordinates of the button devices.

20. The non-transitory computer-readable medium of claim 16, wherein the instructions further cause the gaming system to broadcast and multicast communications to at least the first and second button devices.

21. A computer-readable, non-transitory medium including executable instruction for discovering unaddressed button devices connected to a communications bus in a wagering game system and assigning the button devices unique communication addresses, the instructions, when executed by the wagering game system, causing the wagering game system to perform the method comprising:

initiating, via one or more processors, a boot-up sequence of a central processing unit (CPU) of the game system;

transmitting, via a button device communications controller connected to the CPU, a first request to a configuration address on the communications bus, the communications bus including at least a first unaddressed button device and a second unaddressed button device, an address-out register of the first button device being connected to an address-in register of the second button device via an address signal line, the first button device initially sending a do-not-respond indicator to the second button device via the address signal line;

receiving the first request at the first and second button devices, the first request causing no response from the second button device due to the do-not-respond indicator and causing the first button to respond in the absence of the do-not-respond indicator;

detecting, via the button device communications controller, a first response to the first request, the first response originating from the first button device;

in response to detecting the first response, assigning a first communication address to the first button device, causing the first button device to terminate the do-not-respond indicator;

transmitting a second request to the configuration address;

receiving the second request at the first and second button devices, the second request causing no response from the newly addressed first button device and causing the second device to respond in the absence of the do-not-respond indicator;

detecting a second response to the second request, the second response originating from the second button device;

in response to detecting the second response, assigning a second communication address to the second button device, causing the second button device to terminate the do-not-respond indicator; and transmitting wagering game-related content to at least one of the first and second button devices at the first and second communication addresses, respectively, and transmitting game input information from the button devices to the CPU.

22. The method of claim 21, wherein the address-out register of the second button device is connected to the button device communication controller via the address signal line, the unaddressed second button device initially sending a do-not-respond indicator to the button communication controller via the address signal line, and wherein assigning the second communication address to the second button device causes the second button device to terminate the do-not-respond indicator, which further causes the button device communication controller to cease transmitting requests to the configuration address.

23. The method of claim 21, wherein the wagering game-related content includes at least one of the group consisting of audio content, video content, program code, and configuration information.

24. The method of claim 21, wherein the do-not-respond indicator is an indicator selected from the group consisting of a high signal, a low signal, and a data value.

* * * * *